Patented Dec. 25, 1934

1,985,870

UNITED STATES PATENT OFFICE 1,985,870

ARTIFICIAL RESIN

Arthur J. Norton and Lothar Sontag, North Tonawanda, N. Y., assignors to General Plastics, Inc., North Tonawanda, N. Y.

No Drawing. Application December 16, 1932, Serial No. 647,697

13 Claims. (Cl. 260—3)

This invention relates to artificial resinous materials obtained by condensation of aldehydes and cyclic ketones and to the articles produced thereby and more particularly to the condensation of cyclopentanone or its derivatives and an aldehyde.

Resins have been produced hereto by condensation of aldehydes with a phenol such as carbolic acid, on the one hand, and a cyclic ketone, such as cyclohexanone, on the other hand. Derivatives of the first type have found wide spread use in the preparation of molded articles since they may be prepared as thermo-setting resins and are readily molded by hot molding processes. Resins, however, prepared from derivatives of the cyclic ketones, such as cyclohexanone, have not been prepared in any great quantity and the resins produced therefrom are normally brittle materials of no practical value, statements in the literature to the contrary notwithstanding.

Many of the resins produced from cyclic materials, as for instance the phenol formaldehyde resins, while possessing exceptional properties as molding resins, have heretofore, without exception, possessed a peculiar disadvantage, namely the proneness to darken upon exposure to light. Even where exceptionally pure carbolic acid and other ingredients of the condensation reaction have been initially used and light colored products initially formed, these light colored products always darken and change to yellowish and brownish shades upon exposure to light. The use of phenol formaldehyde resins, therefore, has been restricted to the production of darker shades of color and the market for these resins has thus been materially restricted.

The methods of the present invention provide a resinous product which is thermo-setting, is capable of being molded, and which may be produced in the lighter shades of color, white or colorless, as may be desired, and which does not darken upon exposure to light.

The resins which are the subject matter of this invention can be prepared from cyclopentanone or its derivatives and an aldehyde by causing a chemical reaction or condensation therebetween in the presence of a suitable condensing agent. Under certain conditions of operation it may be desirable to use alkaline catalysts. Thus, the condensation may be caused to take place in the presence of alkali such as caustic soda, or barium hydroxide, sodium carbonate or borax.

It is possible to carry out this condensation reaction and produce a resin in one stage or to induce the formation of the resin in a so-called two stage process to make a permanently fusible resin.

In working in accordance with the present invention, soluble and fusible resins are produced with the aid of mild alkaline catalysts; insoluble, infusible resins are produced by condensing with a stronger alkaline catalyst or condensing agent such as sodium hydroxide.

In preparing a resin in accordance with the so-called one stage process, approximately one molar quantity of cyclopentanone and one and one-half molar quantity of formaldehyde such as 37% formaldehyde, are heated in the presence of a small quantity of a mild alkali, such as ½% of sodium carbonate, until a temperature of about 80° C., to 90° C., is reached and thereafter the mixture is held at that temperature until a syrupy material is obtained which is dehydrated to a brittle product.

In the two stage process equimolar quantities of cyclopentanone and formaldehyde, in the presence of a catalyst are heated gradually until a temperature of about 100° C., is obtained and held there from three to four hours until a syrupy liquid is obtained. This liquid after dehydration may be run into pans and allowed to cool and solidify and thereafter is crushed and used as a resin for molding, bonding and the like when admixed with a strong alkali as 1% of caustic soda.

The resins produced by either the one stage or the two stage process are light colored, white or colorless. Actual exposures of samples of resin produced by this invention do not darken on exposure to rays from a mercury arc lamp.

The resins produced from cyclopentanone and an aldehyde can be directly molded, or if not potentially reactive can be mixed with a condensing agent such as caustic soda and molded under heat or heat and pressure.

When using formaldehyde the ratio of molar quantities of cyclopentanone to formaldehyde may be changed from about ¾ of a mole to 2 moles of formaldehyde per mole of the ketone. Thus where 2 moles of formaldehyde are used and the condensation caused to occur in the presence of an alkali such as sodium borate, the reaction proceeds somewhat vigorously and the temperature should be regulated by cooling the reaction chamber. The resinous product so formed is a lustrous, hard, solid resin, fusible at elevated temperatures and setting to a hard, infusible resin upon prolonged application of heat.

Example 1

| | Grams |
|---|---|
| Cyclopentanone | 100 |
| 37% formaldehyde | 150 |
| Sodium carbonate | ½ |

Heat to 100° C., and dehydrated to a brittle resinous product.

Example 2

| | Grams |
|---|---|
| Cyclopentanone | 100 |
| 37% formaldehyde | 125 |
| Sodium borate | 4 |

Reflux at 100° C., until a syrupy liquid is obtained which can be dehydrated to a brittle, permanently fusible resin.

Example 3

| | Grams |
|---|---|
| Cyclopentanone | 100 |
| 37% formaldehyde | 150 |
| Sodium borate | 4 |

Heat the mixture to boiling and reflux until the formaldehyde is initially combined then add excess acid to one percent acid and continue condensation until on dehydration a resin is formed.

Example 4

| | Grams |
|---|---|
| Cyclopentanone | 100 |
| 25% acetaldehyde | 210 |
| Caustic soda | 2 |

Reflux until an oil separates and dehydrate to a brittle resin.

Example 5

| | Grams |
|---|---|
| Methyl cyclopentanone | 100 |
| 37% formaldehyde | 125 |
| Sodium carbonate | ½ |

Reflux about 20 hours at 100° C., and dehydrate to a brittle resinous product.

What is claimed is:

1. A synthetic resin prepared from the reaction of cyclopentanone and an aliphatic aldehyde.

2. A new resinous material capable of being hardened under the influence of heat and not discolored by the action of light, and prepared from the reaction of a homolog of cyclopentanone and an aliphatic aldehyde.

3. A thermo-setting resin prepared from the reaction of cyclopentanone and formaldehyde.

4. The method of forming resinous materials synthetically from the condensation of a cyclic ketone and an aldehyde which comprises mixing one molar quantity of cyclopentanone with from ¾ to two molar quantities of formaldehyde in the presence of a material acting as a condensing agent, causing the cyclopentanone and formaldehyde to react, and thereafter removing the resinous material from the zone of the reaction.

5. The method of forming resinous material synthetically from the condensation of a homolog of cyclopentanone and an aliphatic aldehyde which comprises mixing one molar quantity of the homolog of cyclopentanone with from ¾ to two molar quantities of the aldehyde in the presence of a material acting as a condensing agent, causing the homolog of cyclopentanone and the aldehyde to react, and thereafter removing the resinous material from the zone of the reaction.

6. The method of forming resinous materials synthetically from the condensation of a cyclic ketone of the group consisting of cyclopentanone and its homologs and an aliphatic aldehyde which comprises mixing one molar quantity of the cyclic ketone with ¾ to two molar quantities of the aldehyde, adding a quantity of an alkaline material capable of acting as a condensing aid and causing the cyclic ketone and the aldehyde to react.

7. The method of forming resinous materials synthetically from the condensation of a cyclic ketone of the group consisting of cyclopentanone and its homologs and an aliphatic aldehyde which comprises mixing predetermined quantities of the cyclic ketone and the aldehyde, adding a quantity of a material capable of acting as a condensing aid and causing the materials to react to form the resin.

8. A synthetic resin derived from the interaction of a saturated cyclic ketone with five carbon atoms in the ring and an aliphatic aldehyde, said resin being light in color and retaining the light color upon exposure to light.

9. The method of forming resinous materials synthetically from the condensation of a cyclic ketone and an aldehyde which comprises mixing one molar quantity of cyclopentanone with from ¾ to two molar quantities of acetaldehyde in the presence of a material acting as a condensing agent, causing the cyclopentanone and acetaldehyde to react and thereafter removing the resinous material from the zone of the reaction.

10. The method of forming resinous materials synthetically from the condensation of cyclopentanone and formaldehyde which comprises interacting a quantity of cyclopentanone and formaldehyde sufficient to form a resin in the presence of a material capable of acting as a condensing aid.

11. A thermo-setting resin prepared from the reaction of cyclopentanone and acetaldehyde.

12. The method of forming resinous materials synthetically from the condensation of a cyclic ketone of the group consisting of cyclopentanone and homologs of cyclopentanone and an aliphatic aldehyde which comprises mixing with a given quantity of the cyclic ketone a quantity of the aldehyde sufficient to form a resin therewith and carrying out the resinification in the presence of a condensing aid.

13. The method of forming resinous materials synthetically from the condensation of a cyclic ketone of the group consisting of cyclopentanone and homologs of cyclopentanone and an aliphatic aldehyde which comprises mixing with a given quantity of the cyclic ketone a quantity of the aldehyde sufficient to form a resin therewith and carrying out the resinification under the influence of heat.

ARTHUR J. NORTON.
LOTHAR SONTAG.